G. O. GULLIKSON.
FOUR HORSE EVENER.
APPLICATION FILED DEC. 8, 1915.

1,195,001.

Patented Aug. 15, 1916.

Witnesses
Fenton S. Belt
J. W. Sherwood

Inventor
G. O. Gullikson
By Franklin N. Hough
Attorney

UNITED STATES PATENT OFFICE.

GULLIK O. GULLIKSON, OF FARGO, NORTH DAKOTA.

FOUR-HORSE EVENER.

1,195,001.  Specification of Letters Patent.  Patented Aug. 15, 1916.

Application filed December 8, 1915. Serial No. 65,799.

*To all whom it may concern:*

Be it known that I, GULLIK O. GULLIKSON, a citizen of the United States, residing at Fargo, in the county of Cass and State of North Dakota, have invented certain new and useful Improvements in Four-Horse Eveners; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in four-horse equalizers designed especially for use upon harvesters, etc., and consists of a simple and efficient apparatus of this nature having various details of construction, combinations and arrangements of parts which will be hereinafter fully described, shown in the accompanying drawings and then specifically defined in the appended claims.

My invention is illustrated in the accompanying drawings, in which:—

Figure 1:
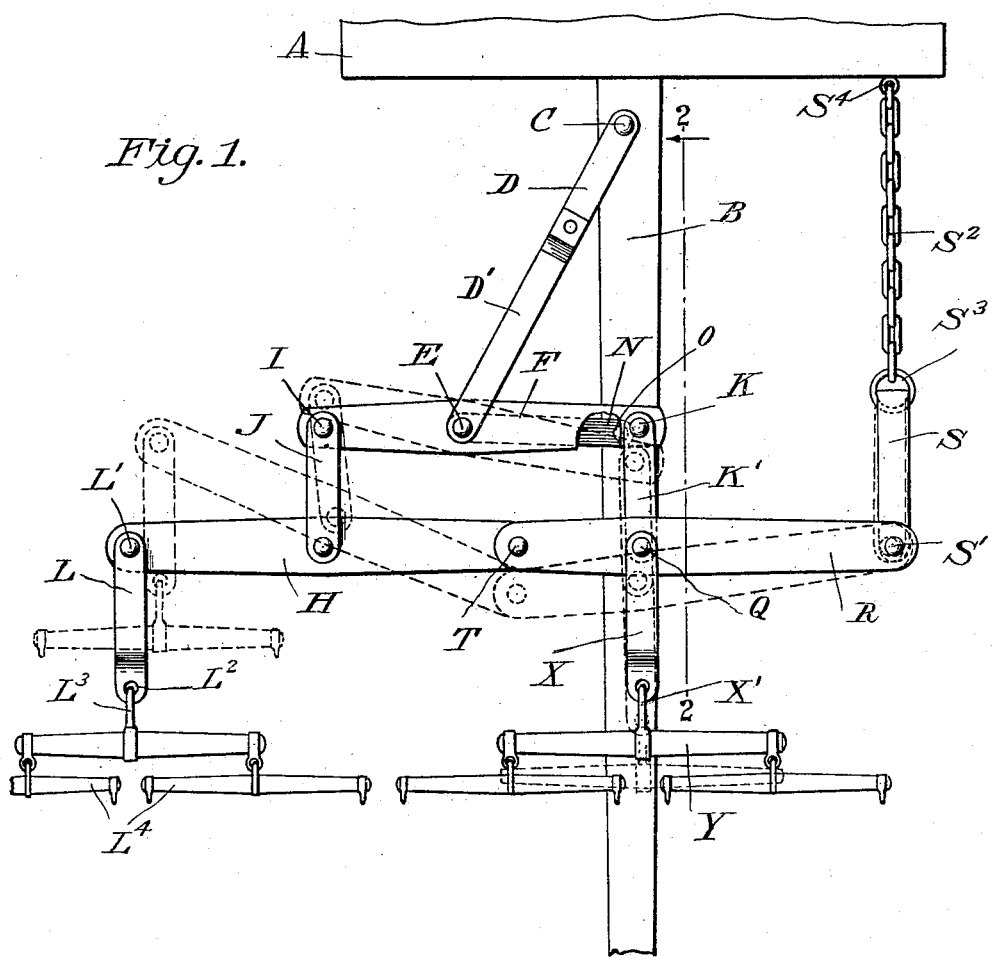
Figure 2:
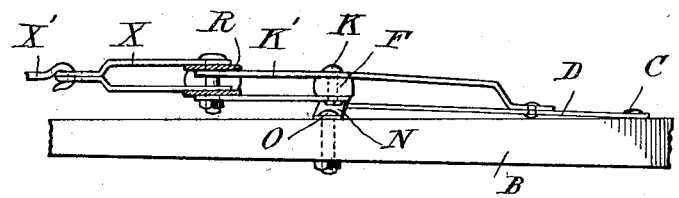

Figure 1 is a top plan view of the invention. Fig. 2 is a sectional view taken on line 2—2 looking in the direction of the arrow.

Reference now being had to the details of the drawings by letter, A designates the harvester frame and B the tongue. Pivotally connected upon the pin C is a forked member D, the forked ends D' of which are spaced apart and carry a pivotal pin E, and F is an evener bar pivoted eccentrically to the pin E and at its outer end the evener F carries a pin I having pivotal connection with the draw bar H through the medium of the links J, and L designate bars which are pivoted at their inner ends to the pin L' and their outer ends are apertured as at L² for the reception of the evener connecting hook L³ which carries the doubletrees L⁴.

A bar N is fastened rigidly at its inner end to the tongue by means of the bolt O and through which bar the pivotal pin E passes. Links K' are pivotally connected through the medium of the pivot K to the inner end of the evener F and said links K' are pivotally connected in turn to a pivot Q passing through the two parallel evener bars R which, through the medium of the pin T, are pivotally connected to the inner end of the draft bar H. A bar, designated by letter S, is bent upon itself and a pivotal pin S' passes through registering apertures in said ends and pivotally connects the same with the outer end of the evener bar R. A chain S² connects at one end to a ring S³, held by the bar S, bent as described, and its other end is fastened as at S⁴ to the frame of the harvester. Links X are pivotally connected to the bars R at their inner ends and their other ends are provided with registering apertures adapted to receive the connecting member X' which is fastened to the two-horse evener Y.

By the provision of an evener constructed as shown and described, it will be noted that the draft animals, when hitched to the eveners, will equalize the pull upon the harvester by reason of the varying leverage obtained by the connection of the parts when the draft animals are hitched to the eveners at the whiffletrees positioned opposite the longitudinal center of the tongue and the other at one side.

What I claim to be new is:—

1. A four-horse evener for harvesters, etc., comprising, in combination with the harvester frame and tongue rigidly held thereto, a forked member fastened at one end to the tongue, a bar secured rigidly to the tongue and projecting at right angles therefrom, a pivotal pin passing through said bar and arms of the forked member, a draft bar pivoted eccentrically upon said pin, other draft bars pivotally connected together at their ends and having pivotal link connections with said eccentrically pivoted draft bar, eveners having pivotal link connections with said pivotally connected draft bars, and connections between one of the latter and the frame of the harvester.

2. A four-horse evener for harvesters, etc., comprising, in combination with the harvester frame and tongue rigidly held thereto, a forked member fastened at one end to the tongue, a bar secured rigidly to the tongue and projecting at right angles therefrom, a pivotal pin passing through said bar and arms of the forked member, a draft bar pivoted eccentrically upon said pin, other draft bars pivotally connected together at their ends and having pivotal link connections with said eccentrically pivoted draft bar, eveners having pivotal link connections with said pivotally connected draft bars, a bar bent upon itself and pivotally connected to the end of one of said draft bars which are pivoted together at their inner ends, and a chain connecting the bar thus bent upon itself to the frame of the harvester.

In testimony whereof I hereunto affix my signature in presence of two witnesses.

GULLIK O. GULLIKSON.

Witnesses:
    Ed. C. Anderson,
    Carl C. Pitsch.

Copies of this patent may be obtained for five cents each, by addressing the "Commissioner of Patents, Washington, D. C."